US006800111B2

(12) United States Patent
Doubrava et al.

(10) Patent No.: US 6,800,111 B2
(45) Date of Patent: Oct. 5, 2004

(54) METHOD FOR RECOVERING CATALYTIC METALS

(75) Inventors: Jeffrey Doubrava, Upton, MA (US); Eric C. Lundquist, North Wales, PA (US); James C. Bohling, Lansdale, PA (US)

(73) Assignee: Shipley Company, L.L.C., Marlborough, MA (US)

(*) Notice: Subject to any disclaimer, the term of this patent is extended or adjusted under 35 U.S.C. 154(b) by 259 days.

(21) Appl. No.: 10/051,370

(22) Filed: Jan. 18, 2002

(65) Prior Publication Data
US 2002/0168309 A1 Nov. 14, 2002

Related U.S. Application Data
(60) Provisional application No. 60/262,592, filed on Jan. 18, 2001.

(51) Int. Cl.[7] .............................. C22B 3/22; C22B 11/00
(52) U.S. Cl. .............................. 75/426; 75/714; 75/744
(58) Field of Search ........................... 75/426, 714, 744

(56) References Cited
U.S. PATENT DOCUMENTS

| | | |
|---|---|---|
| 3,011,920 A | 12/1961 | Shipley, Jr. |
| 3,332,771 A | 7/1967 | Heidt |
| 3,532,518 A | 10/1970 | D'Ottavio et al. |
| 4,020,009 A | 4/1977 | Gulla |
| 4,085,066 A | 4/1978 | Gulla |
| 4,120,819 A | 10/1978 | Small |
| 4,164,481 A | 8/1979 | Ma et al. |
| 4,223,173 A | 9/1980 | Manziek |
| 4,227,899 A | 10/1980 | Meny et al. |
| 4,240,909 A | 12/1980 | Manziek |
| 4,260,493 A | 4/1981 | Kretas et al. |
| 4,261,738 A | 4/1981 | Valentine et al. |
| 4,303,704 A | 12/1981 | Courduvelis et al. |
| 4,311,811 A | 1/1982 | Manziek |
| 4,311,812 A | 1/1982 | Manziek |
| 4,355,140 A | 10/1982 | Manziek |
| 4,410,665 A | 10/1983 | Manziek |
| 4,420,401 A | 12/1983 | Kretas et al. |

(List continued on next page.)

FOREIGN PATENT DOCUMENTS

CZ             224 741         8/1985

OTHER PUBLICATIONS

Ezawa et al., "Extraction and Recovery of Precious Metals from Plating Solutions Using Molecular Recognition Technology", Transactions of the Institute of Metal Finishing, Institute of Metal Finishing, London, GB, vol. 78, No. 6, Nov. 1, 2000, pp. 238–242, XP001012176, ISSN: 0020–2967, p. 240, last paragraph—p. 241.

(List continued on next page.)

Primary Examiner—Melvyn Andrews
(74) Attorney, Agent, or Firm—John J. Piskorski

(57) ABSTRACT

A method for recovering catalytic metals from compositions containing catalytic metal colloids. Compositions such as rinse solutions or dragout baths containing catalytic metal colloids are passed through a filter that entraps catalytic metal colloids from the solutions. The catalytic metal colloid has a high affinity for the filter in contrast to other components of the solutions. The other components of the solution pass through the filter concentrating the catalytic colloid on the filter. The filter containing the catalytic metal colloid is rinsed with an acid solution to remove the catalytic metal from the filter. The catalytic metal is collected in a suitable container or on an adsorbent such as a resin. The method is economically efficient and environmentally friendly.

19 Claims, 1 Drawing Sheet

U.S. PATENT DOCUMENTS

| | | | |
|---|---|---|---|
| 4,435,258 | A | 3/1984 | Melka, Jr. et al. |
| 4,593,016 | A | 6/1986 | Amelio et al. |
| 4,600,699 | A | 7/1986 | Courduvelis et al. |
| 5,009,965 | A | 4/1991 | Feldstein |
| 5,047,563 | A | 9/1991 | Denton et al. |
| 5,213,895 | A | 5/1993 | Hirai et al. |
| 5,247,078 | A | 9/1993 | Champion et al. |
| 5,302,183 | A | 4/1994 | De Boer et al. |
| 5,304,233 | A | 4/1994 | Awadalla et al. |
| 5,914,195 | A | 6/1999 | Hori et al. |
| 6,147,225 | A | 11/2000 | Gaboury et al. |
| 6,169,045 | B1 | 1/2001 | Pike et al. |
| 6,267,871 | B1 * | 7/2001 | Weakly et al. ............ 205/742 |

OTHER PUBLICATIONS

Patent Abstracts of Japan, vol. 013, No. 072 (C–570), Feb. 17, 1989 & JP 63 265813 A (Nippon Mining Co. Ltd.), Nov. 2, 1988—abstract.

Database WPI, Section Ch, Week 200126, Derwent Publications Ltd., London, GB; AN 2001–248613, XP002199404 & JP 2001 032025 A (Matsuda Sangyo KK), Feb. 6, 2001—abstract.

Database WPI, Section Ch, Week 198505, Derwent Publications Ltd., London, GB; AN 1985–029276 XP002199405 & JP 59 225741 A (Hitachi Ltd), Dec. 18, 1984—abstract.

Disclosed Anonymously, Research Disclosure No. 31448, "Reclamation of Palladium from Colloidal Seeder Solution", Jun. 1990, p. 493.

American Metal Market Publication, "Precious Metals, Platinum Group Can be Recovered with Hydrometallurgy", Jul. 6, 1983, pp. 13.

Izatt et al., "Extraction and Recovery of Precious Metals from Plating Solutions Using Molecular Recognition Technology", IBC Advanced Technologies Paper, Apr. 2000, pp. 1–15.

Drays et al., "Selective Extraction of Palladium From Acidic Nitrate Solutions with Thiamacrocycles–Synergized Dinonylnaphthalenesulfonic Acid Systems", Journal of Radioanalytical and Nuclear Chemistry, vol. 220, No. 1(1997) pp. 105–107.

L. Shengquiang Pang, "Improvements in the Recovery of Palladium From Reprocessing Waste of Spent Nuclear Fuel Reported Earlier", Journal of Radioanalytical and Nuclear Chemistry, Articles, vol. 189. No. 1 (1995)pp. 59–63.

V. Guy et al., "Lipophilic Polythiamacrocycles as Palladium Extracting Agents", Tetrahedron vol. 5, No. 14, 1995, pp. 4065–4074.

Letowski et al., "Platinum and Palladium Recovery From Spent Catalysts By Aluminum Chloride Leaching", Proceedings of he International Symposium on Recycle and Secondary Recovery of Metals and the Fall Extractive and Process Metallurgy meeting sponsored by the Physical Chemistry Committee of the Metallurgical Society of AIME Held in Fort Lauderdale, Florida, Dec. 1–4, 1985, pp. 735–745.

Saito et al., "Synthesis of Thiacrown Ether Carboxylic Acids and Their Characteristics as Extractants for Metal Ions", Analytica Chimica Acta 299 (1994) pp. 137–144.

B. Godlewska–Zylkiewicz et al., "Ion–Exchange Preconcentration and Separation of Trace Amounts of Platinum and Palladium", Analytical Letters, 33(13), 2000, pp. 2805–2820.

L. Shengquiang, "Improvements in the Recovery of Palladium From Reprocessing Waste of Spent Nuclear Fuel Reported Earlier", Journal of Radioanalytical and Nuclear Chemistry, Articles, vol. 189, No. 1(1995), pp. 59–63.

* cited by examiner

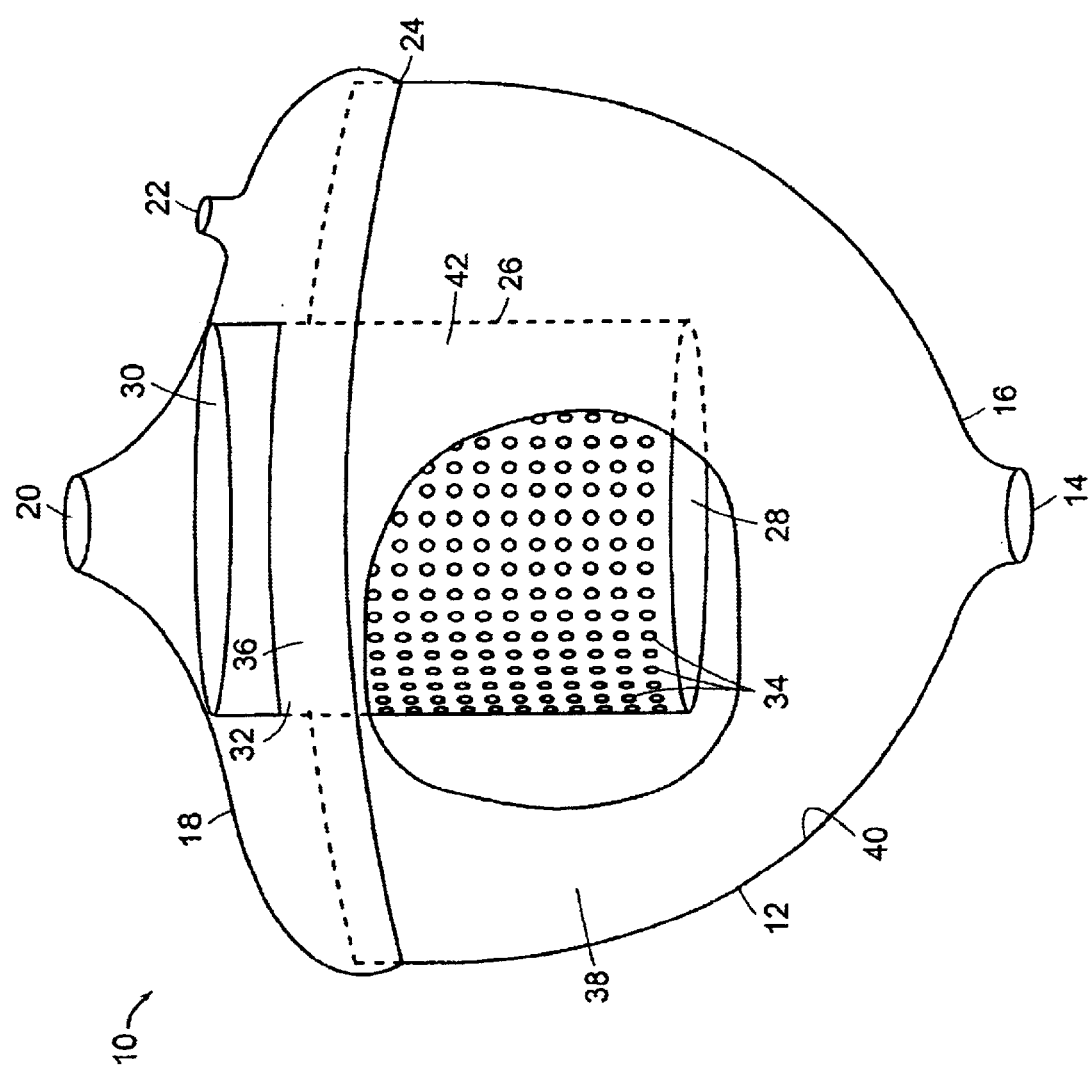

METHOD FOR RECOVERING CATALYTIC METALS

This application claims the benefit of Provisional application No. 60/262,592, filed Jan. 18, 2001.

BACKGROUND OF THE INVENTION

The present invention is directed to a method of recovering catalytic metals. More specifically, the present invention is directed to a method of recovering catalytic metals from compositions containing catalytic metal colloids.

Electroless metal deposition refers to the chemical deposition of a metal on a conductive, non-conductive, or semiconductive substrate in the absence of an external electric source. Electroless deposition is used for many purposes, for example, in the manufacture of printed circuit boards where, in one method, an electroless metal, often copper, is deposited on a dielectric substrate either as a uniform surface coating or in a predetermined pattern. The initial electroless copper deposit is thin and may be further built up by electroplating or may be deposited directly to full thickness.

The substrate over which an electroless metal deposit is formed is often a plastic panel which may have a metal foil such as copper laminated to one or both of its surfaces, for example, with adhesive, to form a metal clad substrate. Where both surfaces of the substrate are to be used, connections are provided therebetween by means of holes through the panel at appropriate locations. The walls of the holes are made conductive with electroless coating.

The electroless deposition of a metal on either a metallic or non-metallic substrate requires pretreatment or sensitization of the substrate to render it catalytic to reception of a metal deposit. Catalytic metal colloids are often used as the sensitizer or seeder to prepare the substrate for reception of the metal.

Catalytic metal colloids are dispersions formed by the admixture of a catalytic metal ion and a non-catalytic metal ion in an amount in excess of the catalytic metal ion. Such dispersions are often formed in acidic solutions but also may be formed in alkaline solutions. Suitable catalytic metal ions are well known in the art. Examples of highly desirable catalytic metal ions are the noble metal ions of gold, platinum and palladium. An example of a suitable non-catalytic metal ion used to form the metal colloid is stannous ion. Colloidal baths or solutions may contain tin in amounts of from about 10 to about 50 or more times than the amount of catalytic ion. Such catalysts are commercially available. U.S. Pat. No. 3,011,920 to Shipley, Jr. discloses methods of making such catalysts, the disclosure of which is hereby incorporated in its entirety herein by reference. Also, U.S. Pat. Nos. 4,020,009 and 4,085,066 both to Gulla and assigned to Shipley Company, Inc. disclose catalytic metal colloids and methods of making the same, the disclosures of which are hereby incorporated in their entireties herein by reference.

Prior to electroless metal deposition on a substrate, such as a printed circuit board, the part of the substrate to be plated is immersed in a catalyst bath or solution. The substrate is then rinsed with water and then placed in an electroless bath for plating. About 70% or more of the catalyst consumed by the substrate during immersion is washed off of the substrate by the rinse. Thus, only about 30% or less of the catalyst remains on the substrate. The catalytic metal colloids represent a major cost in electroless metal deposition. Thus, recovering the catalytic metal colloids for reuse is highly desirable. However, recovery of the catalytic metal from the rinse is difficult because the catalytic metal is in small concentrations and the non-catalytic metal, such as tin, is present in large concentrations. Thus, the rinse is often discarded with the loss of the catalytic metal.

In addition to the loss of catalytic metal from rinses, catalytic metals also are lost from the catalytic metal colloidal solutions or baths. For example, when employing copper clad substrates, such as printed circuit boards, which are drilled to provide through-holes, the through-holes are metal plated to provide a continuous current path when individual boards are joined together. Because the exposed surfaces in the holes are non-metallic, electroless plating techniques including the step of catalyzing by means of a catalytic metal colloid, such as tin/palladium colloid catalyst, is employed. Copper clad boards are immersed in the catalytic bath to deposit the catalyst thereon. Copper from the copper clad boards contaminates the catalytic metal colloidal bath with continued use of the bath. When the contamination reaches an extent such that the bath becomes ineffective or the electroless plating becomes less adherent than desirable, the bath is "spent" and is then discarded as waste.

Because many of the metals employed in the catalytic metal colloids are costly, especially gold, platinum and palladium, industries, such as the printed circuit board industry, would prefer to recover the metals rather than dispose of them. Recovery of the metals would reduce manufacturing costs to manufacturers of printed circuit boards and reduce costs to the manufacturers' customers. Also, the catalytic metals present a hazard to the environment, and disposal of the metals is strictly regulated by the Federal and State governments. Often large volumes of liquid waste are transported far distances to designated sites for proper disposal. Thus, proper disposal procedures for the metals are costly to the industry and much of the cost is passed onto the customer. Although recovery of catalytic metals from catalytic metal colloids is highly desirable, an economically efficient method for the recovery of the catalytic metal from colloids has not been developed. Accordingly, there is a need for an economically and environmentally safe method for recovering catalytic metals from colloidal metal catalysts.

A few attempts have been made to recover catalytic metals from waste solutions. U.S. Pat. No. 4,435,258 to Milka, Jr. et al. and assigned to Western Electric Co., Inc. discloses a method of recovering palladium from spent electroless catalytic baths employing an electrolytic cell. The method of recovery disclosed in the '258 patent involves (a) dissolving tin/palladium colloid in a spent catalytic bath with an oxidizing agent such as hydrogen peroxide to form a true solution; (b) heating the bath to a temperature and for a time sufficient to essentially remove excess hydrogen peroxide; (c) placing the solution in an electrolytic cell having (1) a nickel anode, and (2) a cathode composed of a metal or metallic surface, such as copper or nickel, for the palladium to be deposited; and (d) electrodeposition of palladium from the solution onto the cathode at a voltage that allegedly tends to minimize and substantially reduce tin deposits. There are many disadvantages with such a method. Electrolytic cells can be costly. The consumer of the palladium colloid either has to invest in purchasing such electrolytic cells, or pay the cost of transporting the spent catalytic bath to a site where the electrolytic cell is located. Because of the weight of fluids, the cost of transporting the bath to the recovery site is expensive. If the consumer purchases the electrolytic cell, then the consumer must expend funds in both operating and maintaining the cell. Such an electrolytic cell as described in the '258 patent is specially designed and replacement of worn parts may not be inexpensive or readily obtainable. For example, the electrolytic cell of the '258 patent has a specially designed cascading structure to allegedly prevent deposited palladium from breaking away from the cathode. Also, a high purity nickel anode and cathode are recommended to obtain acceptable recovery amounts of palladium. Such adds to the cost of the apparatus. Amounts of palladium recovered also depend on the amounts of specific components in the colloidal bath as well as any contaminants. The more dilute the palladium and the more contaminants in bath the more difficult the recovery of the palladium. Such contaminants as copper salts or other metal contaminants may compete for deposition at the electrodes with the palladium. Several palladium colloidal catalysts are obtainable from commercial sources and the specific components and purity vary. Thus, the efficiency of such electrolytic cells may vary. Another problem associated with such electrolytic cells is duration of operation. High recovery of palladium by an electrolytic cell often requires many hours of operation. Such long hours of operation increase the cost of recovering catalytic metal and add wear to the electrolytic cell.

Research Disclosure 31448 (anonymous, June 1990) entitled "Reclamation of Palladium from Colloidal Seeder Solutions" discloses a method of recovering palladium from colloidal tin/palladium solutions used to promote electroless metal depositions. The palladium is recovered by flocculating the colloid by rapid mixing with air or oxygen. The oxygen allegedly does not oxidize the palladium. A palladium rich precipitate is allegedly obtained. The precipitate is dried and further processed. The document is silent on the further processing of the precipitate to recover the palladium as well as the efficiency of the disclosed method. The document only mentions that the method is intended to eliminate costly trucking of the hazardous waste from the colloidal solutions.

U.S. Pat. No. 5,302,183 to De Boer et al. and assigned to Shell Oil Company discloses a method of recovering precious metals such as platinum and palladium from non-aqueous effluents in colloidal and/or dissolved states. Such effluents are from non-aqueous effluents leaving flow-through reactors or bleed streams from a stripping reactor, not from aqueous solutions of colloidal catalysts or aqueous rinses as employed in the circuit board industry. The non-aqueous colloidal metal and/or dissolved metal effluents may be initially distilled to remove unwanted reaction product in the effluent. The non-aqueous effluent also may be dried to remove any water or the effluent may be filtered. The patent is silent on the specific method or efficiency of the filtering method. If the aforementioned steps are eliminated, the non-aqueous effluent may be immediately reduced with a reducing agent. The reducing agent is added to the non-aqueous effluent to complete reduction of any cationic precious metals present in the non-aqueous effluent. Suitable reduction agents are carbon monoxide and lower olefins such as ethylene. The reducing agents are contacted with the non-aqueous effluent in a gaseous state.

After reduction, the reduced precious metal is deposited on a support such as activated carbon or porous granular plastic or resin. The reduced precious metal deposited on the support may be recovered by filtration, decanting, centrifugation or the support may be burned and the precious metal transported to the appropriate facilities for further processing.

Although the '183 patent alleges a high recovery of precious metal from the disclosed process, the process suffers from a number of disadvantages. First, the reducing step employs expensive technological equipment such as gas chambers to apply the reducing agent in gaseous form to the non-aqueous effluent. Such a step involves transporting the non-aqueous effluent to a facility having such equipment, or the purchase and maintenance of such equipment by the workers where the non-aqueous effluent is recovered. Additionally, trained workers are employed in the operation of the equipment used in the reducing step adding to the cost of the process. Thus, the reduction step is costly. Further, carbon monoxide is a preferred reducing gas. Carbon monoxide gas is very toxic and presents a hazard to workers performing the reduction process. The other reducing agent, i.e., the lower olefins, also may present a hazard to workers. For example, ethylene presents a serious flammability problem.

Adsorbents such as resins are known in the art to be used for recovering precious metals from aqueous solutions. A paper entitled "Extraction and Recovery of Precious metals from Plating solutions Using Molecular Recognition Technology" by S. R. Izatt et al. discloses the use of SuperLig® 127 resin for selectively recovering potassium gold cyanide from drag out rinse solutions, and SuperLig® 2 resin for recovering palladium metal from dipping baths. SuperLig® resins are proprietary crown ether resins obtainable from IBC Advanced Technologies Inc., of American Fork, Utah. A disadvantage in the method for recovering potassium gold cyanide by the method using SuperLig® 127 resin is that a concentrator with a vacuum and a heat exchanger is employed to concentrate the potassium gold cyanide from drag out rinse solutions to a concentration of 16 g/l. Such apparatus adds to the cost of the process. A disadvantage of both the potassium gold cyanide and the palladium recovery processes is the limiting of the recovery processes to the use of a specific proprietary resin. A worker practicing the method is restricted to using a specific proprietary resin without an alternative material for recovering the metals. Thus, the method is inflexible for the worker. Also, such resins are costly to manufacture and often require skilled workers to operate the resins and maintain them. Another problem with employing resins, in general, is that the resins may become fouled with salts, non-catalytic metals and precipitated solids during the recovery process. Thus the resins have to be regenerated or replaced with new resins to continue the recovery process. The added step of regenerating the resins delays the recovery process. Also, some of the catalytic metal mixed with the materials that foul the resin may be lost during regeneration. Replacing the fouled resin with new resin adds to the cost of the recovery process. Accordingly, there is a need for a more economic and flexible method for recovering catalytic metals.

SUMMARY OF THE INVENTION

The present invention is directed to a method of recovering catalytic metals from a fluid containing catalytic metal colloids and precipitated solids by filtering the catalytic metal colloids and precipitated solids from the fluid followed by removing the catalytic metal from the filter. The catalytic metal removed from the filter may be collected in any suitable container. The catalytic metal may be retrieved from the container and the catalytic metal may be further processed by known methods in the art to recover the catalytic metal. Advantageously, the method of the present invention provides an economically efficient means of recovering catalytic metals for reuse. Filtering the catalytic metal colloid species and precipitated solids from a fluid containing the colloid separates and concentrates the catalytic metal colloid from many other components of the fluid that may interfere with catalytic metal recovery or increase both the time and expense for recovery. Such other components may be excess non-catalytic metal, salts, contaminants, and the like.

Catalytic metal colloids are employed in metal deposition processes and compositions. Such metal deposition compositions include electrolytic and electroless solutions, i.e., solutions capable of the chemical deposition of an adherent metal coating on a conductive, non-conductive, or semi-conductive substrate in the absence of an external electric source. The part of the substrate to be plated with a metal is contacted with a catalytic metal colloid solution or bath to coat the substrate with the colloid. The catalytic metal colloid acts as a seeder for metal deposition on the substrate. The substrate may then be placed in a metal plating solution for metal deposition. The substrate may be rinsed a number of times during the process. Some of the catalytic colloid is carried away in the rinse. Because the catalytic metal colloids represent a major cost of operating metal deposition processes, recovering the catalytic metal is highly desirable. Filtering rinse solutions captures and concentrates the catalytic metal colloid and precipitated solids on the filter. The filter allows much of the excess non-catalytic metal, plating metals, metal salts, complexing ions, reducing agents, alkali metal salts, pH adjusters, brightners, stabilizers, and other components in the rinse solutions to pass through the filter. Thus, the filtering step provides a rapid and efficient means of recovering catalytic metal colloids. The catalytic metal is washed from the filter with an oxidizer and the catalytic metal is collected in a suitable container or on an adsorbent.

The method of the present invention is highly desirable for any industry where catalytic metal colloids are employed. The printed circuit board industry, where catalytic colloids are employed in metal deposition processes, especially benefits from the recovery method of the present invention. Expensive catalytic metals may be readily recovered without additional expensive equipment or complex time consuming steps. Further, the filtering process may be performed at the site where the catalytic metal colloids are employed, and the process does not require highly skilled workers. Thus, the method of recovering catalytic metals is economically efficient.

Additionally, the method of the present invention is environmentally friendly. The method of the present invention provides a high recovery of catalytic metals that are potentially hazardous to the environment. Also, the filtered catalytic metal colloid may be transported to another site for further processing without the expense or danger of spillage as with large volumes of hazardous fluid.

A primary objective of the present invention is to provide a method for recovering catalytic metals from fluids containing catalytic metal colloids and precipitated solids.

Another objective of the present invention is to provide a method for recovering catalytic metal from fluids containing catalytic metal colloids and precipitated solids by a two-step method.

A further objective of the present invention is to provide a method of recovering catalytic metals from a catalytic metal colloid by an economically efficient means.

Still yet a further objective of the present invention is to provide a method for recovering catalytic metals from a catalytic metal colloid that is environmentally friendly.

Additional objectives and advantages of the present invention may be ascertained by those of skill in the art by reading the detailed description of the invention and the appended claims.

BRIEF DESCRIPTION OF THE DRAWING

Figure is a cross section of an apparatus with a filter that may be employed to practice the present invention.

DETAILED DESCRIPTION OF THE INVENTION

The present invention is directed to a method of recovering catalytic metals from fluids containing catalytic metal colloids and precipitated solids. Fluids or solutions containing the catalytic metal colloids are contacted with a filter that captures and concentrates the catalytic metal colloids and precipitated solids. Much of the precipitated solids are composed of the catalytic metal colloid and some of the non-catalytic metal that composes the colloid. Other components in the fluid or solution pass through the filter leaving the catalytic metal colloids entrapped and concentrated on the filter. After the catalytic metal colloids are entrapped on the filter, the catalytic metal colloids are washed with an oxidizer such as an acid solution to remove the catalytic metal from the filter. Oxidizers break down much of the colloidal structure and solubilizes the catalytic metal and precipitated solids. The metal may be collected in any suitable container or on an adsorbent. The metal in the container or on the adsorbent may then be retrieved by any suitable means known in the art and the catalytic metal reused.

Catalytic metal colloids are dispersions of catalytic metal ions in combination with non-catalytic metal ions in excess of the catalytic metal ions. The non-catalytic metal ions reduce the catalytic metal ions and a dispersion of solid particles is formed in solution. Such solutions may be aqueous or non-aqueous. Such catalytic metal colloids are well known in the art. Catalytic metals include, but are not limited to, copper, beryllium, aluminum, tungsten, tellurium, nickel, gold, platinum, palladium, silver, germanium, molybdenum, selenium, rhodium, osmium, iridium, ruthenium, lead and magnesium. Preferred metal catalysts are the noble metals such as gold, platinum and palladium with palladium the most preferred. Non-catalytic metals admixed in excess with the catalytic metals include, but are not limited to, stannous ions. Preferred colloidal catalysts are tin/palladium, tin/platinum and tin/gold with tin/palladium the most preferred. U.S. Pat. Nos. 3,011,920; 4,020,009; and 4,085,066 disclose a number of catalytic metal colloids and methods of making them, the disclosures of which are hereby incorporated herein in their entirety by reference.

Any suitable filter may be employed to filter the solid catalytic metal colloid particles and precipitated solids from a solution as long as the filter entraps and concentrates the catalytic metal colloid and precipitated solids, and allows other components in the solution to pass through the filter, or the other components are at least easier to remove from the filter material than the colloid. Surprisingly, catalytic metal colloids adhere to a wide variety of materials allowing the catalytic metal colloids to be entrapped and concentrated on the filter material while allowing unwanted components to pass through the filter material. Such unwanted components are components that can interfere with the efficient and optimum recovery of the catalytic metal. Such components include, but are not limited to, the non-catalytic metal that is part of the colloid such as the stannous ion. Such non-catalytic metal is employed in the catalytic metal colloid in amounts of from about 10 to about 50 times or more than the amount of catalytic metal. Thus, the separation of as much of the non-catalytic metal from the colloid is highly desirable in the recovery of the catalytic metal. Advantageously, by filtering a composition or solution containing a catalytic metal colloid the ratio of the non-catalytic metal to catalytic metal is reduced. Excess non-catalytic metal is separated from the colloid. The solids filtration step removes from at least about 35% by weight, preferably from at least about 55% by weight, most preferably at least about 85% by weight of the non-catalytic metal from the colloid. The ratio of the non-catalytic metal to the catalytic metal of the colloid can be reduced from about 40% to about 95% by weight, more often from about 60% to about 80% by weight of the colloid. Materials that are in the solutions and that pass through the filter include, but are not limited to, plating metals such as copper, nickel and the like; reducing agents such as formaldehyde or sodium hypophosphite; alkali metal salts such as sodium and potassium salts; complexing agents such as primary, secondary, tertiary, quaternary amines, various carboxylic acids and various amino acids; pH adjusters such as sodium carbonate, sodium bicarbonate, sodium hydroxide, ammonium hydroxide and acetic acid; brighteners; and stabilizers or surfactants. Such metals, salts and various other materials compose a greater part of solutions from which the catalytic metals are recovered. The catalytic metals compose from about 0.0001% by weight or less to about 0.05% by weight of such solutions. Such solutions include, but are not limited to, rinse solutions or dragout baths collected from substrates treated with compositions or solutions containing catalytic metal colloids.

For example the part of the substrate to be plated with a metal is contacted with a catalytic metal colloid solution or bath to coat the substrate with the colloid. Suitable substrates are printed circuit or wiring boards. The catalytic metal colloid bath seeds the substrate with the catalytic metal colloid for electroless plating. Such solutions may contain a catalytic metal chloride such as palladium chloride; stannous chloride; and hydrochloric acid to acidify the solution and the balance water. Examples of other components of catalytic metal colloid baths include sodium stannate; platinum chloride; gold chloride; formaldehyde; sodium chloride; sodium citrate; and sodium hydroxide. Such baths are high in concentrations of stannous and stannate ions, and sodium and chloride ions in contrast to the amount of catalytic metal. Such ions may comprise from about 15% to about 30% by weight of the bath with much of the remaining weight water. The baths may be acidic or alkaline. The pH of the bath may range from about 1.0 to about 9.0. After the substrate is contacted with the catalytic metal colloid solution, the substrate is rinsed with water and the rinse is collected for filtering. The rinse from the substrate contains many of the components included in the bath in addition to the catalytic metal colloid. The catalytic metal colloid is recovered by filtering the rinse to entrap and concentrate the catalytic colloid and precipitated solids on the filter. The catalytic metal colloid surprisingly has a high affinity for the filter. The other components from the rinse do not have as high an affinity for the filter and most of the other components pass through. The filter with the entrapped catalytic metal colloid may be rinsed with water to remove any non-catalytic metal colloid bath components that may be retained on the filter such as surfactants and the like as well as excess stannous ions.

Suitable filters include, but are not limited to, thermoplastic polymer materials, hydrophilic materials, inorganic materials such as activated carbon, silica gel, alumina, silica-alumina, silicon carbide and zirconium silicate; organic materials, such as polystyrene and polystyrene derivatives. Diatomacious earth and pumice and the like also can be employed. Resins such as styrenic-based resins, acrylic based resins, crown ethers and the like also may be employed. However, resins are preferably employed as adsorbents. Examples of suitable resins that may be obtained commercially are the Amborane® resins such as Amborane® 345 and 355; Amberlite® resins such as Amberlite® IRA-75 and IRA-400, and Ambersorb® (all obtainable from Shipley Company, Marlborough, Mass.). The different filters may be employed individually or in combination.

Examples of suitable thermoplastic polymer materials include, but are not limited to, polyolefins such as polyethylene, polypropylene, polybutylene, and copolymers thereof; polyamides such as nylon 6, nylon 6/6, nylon 10, nylon 12 and the like; polyesters such as polythylene terephthalate, polybutylene terephthalate and the like; polycarbonate; polystyrene; thermoplastic elastomers; polyurethane; and blends and copolymers thereof.

Examples of suitable hydrophilic materials include, but are not limited to, high molecular weight polymers such as vinyl polymers such as polyvinyl alcohol, vinyl alcoholethylene copolymer, polyvinyl pyrrolidone, polyhydroxyethyl acrylate, polyhydroxyethyl methacrylate, polyamide acrylate and the like; cellulose derivatives such as hydroxyethyl cellulose, hydroxypropyl cellulose, and the like; polymer saccharides such as chitin, chitosan, alginic acid, and the like; gelatin and the like.

Examples of suitable resins include, but are not limited to, nonionic borane reducing resins. Such resins may be acrylic based amine-borane reducing resins, polystyrene based amine-borane reducing resins, acrylic based phosphineborane reducing resins, or polystyrene based phosphineborane reducing resins. Such resins and methods of making the same are disclosed in U.S. Pat. Nos. 4,240,909; 4,223,173; 4,311,812; 4,311,811; 4,355,140; and 4,410,665 all assigned to Rohm and Haas Company, the disclosures of which are hereby incorporated herein in their entireties by reference.

Examples of suitable crown ethers include, but are not limited to, lipophilic thiacrown ethers such as 2-octyl-1,4,7-trithiacyclononane; 2-octyl-1,4,7-trithiacyclodecane; 2-octyl-1,4,7,10-tetrathiacyclododecane; 6-octyl-1,4,8,11-tetrathiacyclotetradecane; 3-octyl-1,5,9,13-tetrathiacyclohexadecane; 2,11-dioctyl-1,4,7,10,13,16-hexathiacyclooctadecane; 2,15-dioctyl-1,4,7,10,13,16-hexathiacyclooctadecane and the like. Such lipophilic thiacrown ethers are disclosed in "Lipophilic Polythiamacrocycles as Palladium Extracting Agents", by Guyon et al., *Tetrahedron*, Vol. 51, No. 14, pp. 4065–4074, 1995. Also, thiacrown ether carboxylic acids may be employed. Examples of such thiacrown ether carboxylic acids include, but are not limited to, 3,6,10,13-tetrathiacyclotetradec-1-oxyacetic acid (TTCTOAA); and 2-(3,6,10,13-tetrathiacyclotetracec-1-oxy)hexanoic acid (TTCTOHA). The synthesis of such ethers is disclosed in "Synthesis of Thiacrown Ether Carboxylic Acids and Their Characteristics as Extractants for Metal Ions", Saito et al., *Analytica Chimica Acta*, 299, pp. 137–144, 1994. Other suitable thiacrown ether compounds that may be employed to filter catalytic metal colloids include, but are not limited to, thiacrownpolyacrylamide, thiacrownpolyacrylic acid, thiacrownpolyhydroxypropylacrylate and the like. Such polymeric thiacrowns are disclosed in U.S. Pat. No. 6,147,225 to Gaboury et al. and assigned to Betzdearborn Inc., the entire disclosure of which is hereby incorporated herein by reference.

Other crown ethers that may be employed include the chiral crown ethers such as the optically active isomers of bis (12-crown-4 methyl) dialkyl malonates. Such crown ethers are disclosed in U.S. Pat. No. 5,047,563 to Denton et al. and assigned to Miles Inc., the entire disclosure of which is hereby incorporated herein by reference. Diaza crown ethers such as diaza-18-crown-6-ether (DA18C6) also may be employed. The diaza crown ethers and the methods of making the same are disclosed in U.S. Pat. No. 5,247,078 to Champion et al. and assigned to Texaco Chemical Company, the entire disclosure of which is hereby incorporated herein by reference. When ethers are employed, they are preferably bonded to a solid support such as a polystyrene or silica gel support.

Preferred filters are the thermoplastic polymers and the hydrophilic materials. The most preferred are the polyolefins such as polyethylene, polypropylene, polybutylene and copolymers thereof, cellulose derivatives such as hydroxyethyl cellulose, hydroxypropyl cellulose, chitin, chitosin, alginic acid and gelatin. Such filters are preferred because catalytic metal colloids have a high affinity for such thermoplastic and hydrophilic materials and unwanted solution components such as salts readily pass through the membrane structure of the filter. Thus, additional washing or rinsing steps to remove unwanted components that are adsorbed to the filter are avoided or reduced. Additional rinsing steps applied to the filter may result in unwanted loss of some of the catalytic metal from the filter. Further, the structural membranes of such thermoplastic and hydrophilic filters do not collapse when contacted with salts causing the loss of catalytic metal colloids as with some resin materials. Also such filters are cost effective because they are less costly to manufacture than resins, and do not require skilled workers to use them. Such filters have a mean pore size of from about 0.05 $\mu$m to about 10.0$\mu$m. One type of thermoplastic filter that is commercially available is Whatman® polycap HD 1 micron filter paper composed of monofilaments of anisotropic polypropylene (MAPP) in a polypropylene housing (obtainable from Whatman Company, catalog No. 6703–7510).

The filters may be employed by any suitable means or in any suitable apparatus to filter the catalytic metal colloid from a composition or solution. One embodiment of the present invention employs a filter apparatus 10 as shown in the Figure. The apparatus 10 has a base 12 in the shape of a bowl with an outlet 14 at the bottom 16 for the exit flow of fluids. A cover 18 having both an inlet 20 for the ingress of fluids and a vent 22 for air is provided to enclose the top 24 of the bowl. The cover 18 is secured to the top 24 of the bowl by threads (not shown) along its circumference with corresponding threads (not shown) along the top circumference of the bowl. An internal chamber 26 having a cylindrical shape with a base 28 and an open top 30 that is secured to the cover 18. The internal chamber 26 is secured to the cover 18 of the apparatus by means of threads (not shown) located at the top circumference of the internal chamber 26 such that the internal chamber 26 can be screwed onto or off of corresponding threads (not shown) on a circular flange 32 on the cover 18. The circular flange 32 is continuous with the cover 18. The internal chamber 26 has multiple pores 34 about its circumference for the passage of fluids. The pores may vary in size. When the apparatus 10 is assembled an interior space 36 is provided that is enclosed by the cylindrical internal chamber 26 and the circular flange 32, and an external space 38 between the cylindrical internal chamber 26 and the internal surface 40 of the bowl of the apparatus 10. A filter 42 of thermoplastic material, such as polypropylene, having a cylindrical shape that corresponds with the shape of the cylindrical internal chamber 26 rests along the internal surface of the cylindrical internal chamber 26 covering the pores 34 of the internal chamber. When fluid, such as a dragout solution, is passed through the inlet 20, the fluid passes into the interior space 36 and through the filter 42 and through the pores 34 and into the external space 38. The fluid then passes out of the apparatus 10 through the outlet 14. Catalytic metal colloids and precipitated solids in the fluid are entrapped on the filter 42. The apparatus may be made of aluminum, stainless steel glass, plastic, or any suitable material.

After the filtration step the filter containing the catalytic metal colloid and precipitated solids is eluted with an oxidizer and the catalytic metal is collected in a suitable container or on an adsorbent. Optionally, prior to eluting the filter with an acid solution, the filter may be rinsed with water one or more times to be certain that any salt residues left on the filter are removed. The oxidizer solubilizes the catalytic metal colloid by oxidizing the catalytic metal. Thus, the catalytic metal and the non-catalytic metal become soluble ions. For example, in the case of palladium/tin colloid, the palladium and tin (stannous ion) are separated and palladium metal (Pd°) is oxidized to palladium ion (Pd$^{2+}$). The oxidizer elute may be applied to the filter one or more times to solubilize the colloid. One application often is sufficient. Any oxidizer solution that solubilizes catalytic metal colloids may be employed as elute. Acid solutions are preferred for solubilizing catalytic metal colloids. Hydrogen peroxide is another suitable oxidizer. Hydrogen peroxide also may be added to the acid solution to help elution. Any amount of hydrogen peroxide suitable for eluting may be mixed with the acid. An example of a suitable elute of an acid mixed with hydrogen peroxide contains from about 40% to about 70% by weight of an acid and from about 30% to about 60% by weight of hydrogen peroxide, preferably from about 50% to about 65% by weight of an acid and from about 35% to about 50% by weight of hydrogen peroxide. Examples of such acids are nitric acid, sulfuric acid, hydrochloric acid or mixtures thereof. Organic acids such as acetic acid may be employed. The inorganic acids are the preferred acids.

Advantageously, the oxidizer elution step may be performed at the site where the solids filtration step is performed to avoid the expense of transporting the filters with the catalytic metal colloid to another site. Alternatively, the filter with the adsorbed catalytic metal colloid may be transported to another site for elution. Advantageously, the catalytic metal colloid concentrated on the filter may be economically and safely transported to another site for elution. Transportation to another site no longer involves moving large volumes of fluids to distance sites. Thus, the chances of polluting the environment with hazardous waste due to spills are eliminated. Also the cost of transport is less because less weight is involved and more of the catalytic metal colloid can be transported in one load because the colloid is concentrated on a filter.

Catalytic metal ions eluted from the filter may be collected in any suitable container or on any suitable adsorbent. Although some of the catalytic metal remains in colloidal form after elution, most of the catalytic metal is now in ionic form. Preferably, the catalytic metal ions and the catalytic metal colloids are collected onto an adsorbent. Any material that adsorbs catalytic metal ions may be employed. Such adsorbents are well known in the art, and vary in their ability to adsorb a specific ion. The various resins such as the crown ethers and the nonionic borane reducing resins described above are suitable for adsorbing many catalytic metal ions, especially the noble metal ions of gold, platinum and palladium. Examples of commercially available nonionic borane reducing resins are the Amborane® resins. Examples of commercially available crown ethers are the SuperLig® resins (obtainable from IBC Advanced Technologies Inc., American Fork, Utah). Preferred resins for recovering the catalytic metal ions are the nonionic acrylic based amine-borane reducing resins and the nonionic acrylic based phosphine-borane reducing resins. Such resins are preferred for recovering precious metals such as gold, rhodium, platinum and palladium ions, especially palladium ions, because the resins selectively reduce the precious metals. Advantageously, because salts are separated from the catalytic metal colloids during the solids filtration step, less nonionic borane reducing resin can be employed in recovering the catalytic metal ions. Salts, especially salts containing chloride ions, cause the nonionic borane resins to collapse. The collapse of the resins reduces the ability of the resins to reduce and bind the metal ions. Thus, when solutions having significant quantities of salt are contacted with the resin, excess resin is employed to avoid the loss of catalytic metal ions. Because the method of the present invention removes the salts, the amount of resin employed may be reduced from about 10% to about 40% of the amount that metal ion recovery requires with a salt containing composition. In addition to the improved efficiency of using less resin for recovery, the cost of performing the recovery with such resins is reduced. The nonionic acrylic based amine-borane and phospine-borane reducing resins are costly. Thus, the method of the present invention is a more economically efficient method of employing such preferred resins. The catalytic metals may be retrieved from the collection container or adsorbent by any suitable means and further processed by known methods in the art. For example, catalytic metals on the nonionic borane reducing resins or on the crown ethers may be retrieved by burning the resins or ethers. The catalytic metals may then be collected and if desired further processed according to methods known in the art. The method of the present invention recovers at least about 65% by weight of the initial catalytic metal depending upon the filter employed. When preferred filters are employed, the recovery rate is from about 75% to about 95% by weight of the initial catalytic metal.

Although the present invention is described with an emphasis on recovering catalytic metal colloids from aqueous solutions in the printed circuit and wiring board industry, the method of the present invention may be employed in the recovery of catalytic metal colloids from both aqueous and non-aqueous solutions. Other industries that desire to recover catalytic metal colloids from fluid wastes or dragout solutions also may employ the method of the present invention.

The following example is intended to further illustrate the present invention and is not intended to limit the scope of the invention.

EXAMPLE

A tin/palladium colloid was recovered from a 4 liter dragout bath with the composition described below. All percentages are by weight.
1. 0.6% Sodium Bisulfate ($NaHSO_4$)
2. 0.05% Carbamic Acid
3. 3.8% Chloride Compounds
4. 0.0025% Palladium Chloride
5. 0.083% Stannous Chloride
6. 95% Deionized Water When all of the above components were combined in the deionized water, a precipitate of tin/palladium colloid formed. The weight ratio of tin (stannous and stannic ions) to palladium was about 33:1. The dragout bath was filtered in a 100ml column of activated charcoal. The four liters of dragout solution were poured through the inlet over a four hour period (one liter/hour). No break through of black material (palladium) was detected. The filtrate that passed out of the column was collected in a large volume Pyrex® beaker. Large amounts of insoluble tin salts precipitated out of the filtrate as indicated by a white precipitate.

Elemental analysis was done at both the top of the column and about 2.5 cm down the column. At the top of the column, about 10.7% of the elements were tin (stannous and stannic ions) and about 0.65% were palladium (Pd°). The tin/palladium ratio was about 15.4:1. At about 2.5 cm down the column elemental analysis showed about 12% tin and about 0.59% palladium. The ratio of tin/palladium was about 20.3:1. Both of the ratios are improvements over the original tin/palladium ratio of about 33:1. The data showed that much of the tin passed through the column, while the palladium was retained. The ratio of about 15.4:1 at the top of the column showed about a 45% loss of tin from the initial catalytic metal colloid. At the 2.5 cm level of the column, the ratio of tin/palladium increased to about 20.3:1 because most of the palladium was retained at the top of the filter, while the tin passed down through the filter. In addition to the tin, the chloride and other salts of the dragout bath passed through the column.

After all the four liters were passed through the column, the tin/palladium colloids retained on the column were eluted first with 1N nitric acid solution and then with 4.7N hydrochloric acid solution. The elute was recovered in several large volume Pyrex® beakers. The elute had a dark black clear appearance. The black coloring was caused by some reduced palladium still in colloidal form with tin. The excess tin had been washed out when the dragout solution was passed through the column. Most of the palladium was in oxidized form ($Pd^{2+}$).

About 1 gm/100 ml of white Amborane® 345 beads were added to two of the acid elute solutions. The beads began to turn black in about ½ hour indicating that the beads were picking up palladium ions and reducing the ions to palladium metal. The beads were left in the solutions for about 6 hours. After about 6 hours the acid solutions became clear and colorless and the beads became black indicating that most of the palladium metal had been recovered.

What is claimed is:

1. A method of recovering a catalytic metal from a catalytic metal colloid containing composition comprising:
   a) rinsing a substrate of catalytic metal colloid to form a composition comprising a catalytic metal colloid; then
   b) passing the composition comprising the catalytic metal colloid through a filter to concentrate the catalytic metal colloid on the filter; then
   c) removing the catalytic metal of the catalytic metal colloid from the filter with an oxidizer; and then
   d) collecting the catalytic metal.

2. The method of claim 1, wherein the oxidizer is an acid solution.

3. The method of claim 2, wherein the acid comprises nitric acid, sulfuric acid, hydrochloric acid, acetic acid or mixtures thereof.

4. The method of claim 2, wherein the acid solution comprises hydrogen peroxide.

5. The method of claim 1, wherein the catalytic metal colloid comprises catalytic metal and non-catalytic metal and a weight ratio of the non-catalytic metal to the catalytic metal of the colloid is reduced to about 40% to about 95% of the weight ratio alter filtering the composition.

6. The method of claim 1, wherein the filter entraps at least about 65% by weight of the catalytic metal colloid in the composition.

7. The method of claim 6, wherein the filter entraps from about 75% to about 95% by weight of the catalytic metal colloid in the composition.

8. The method of claim 5, wherein the non-catalytic metal colloid component comprises tin.

9. The method of claim 1, wherein the catalytic metal comprises copper, beryllium, aluminum, tungsten, tellurium, nickel, silver, germanium, molybdenum, selenium, rhodium, osmium, iridium, ruthenium, lead, magnesium, gold, platinum, palladium, or mixtures thereof.

10. The method of claim 9, wherein the catalytic metal comprises gold, rhodium, platinum or palladium.

11. The method of claim 1, wherein the filter comprises a thermoplastic polymer, hydrophilic material, activated carbon, silica gel, alumina, silica-alumina, silicon carbide, zirconium silicate, diatomacious earth, or mixtures thereof.

12. The method of claim 11, wherein the thermoplastic polymer comprises polyolefins, polyamides, polyesters, polycarbonate, polystyrene, thermoplastic elastomers or blends and copolymers thereof.

13. The method of claim 1, wherein the catalytic metal colloid containing composition is an aqueous rinse or dragout bath.

14. The method of claim 13, wherein the catalytic metal colloid comprises from about 0.0001% by weight to about 0.05% by weight of the composition.

15. The method of claim 1, wherein the catalytic metal is collected on an adsorbent.

16. The method of claim 15, wherein the adsorbent comprises a nonionic acrylic based amine-borane reducing resin, a nonionic polystyrene based amine-borane resin, a nonionic acrylic based phosphine-borane resin, a nonionic polystyrene based phosphine-borane resin, a lipophilic thiacrown ether, a thiacrown ether carboxylic acid, thiacrown polyacrylamide, thiacrown polyacrylic acid, thiacrown polyhydroxypropylacrylate, chiral crown ethers, diaza crown ethers, or mixtures thereof.

17. The method of claim 16, wherein the adsorbent comprises activated carbon, alumina, silica-alumina, silicon carbide, zirconium silicate, diatomacious earth or silica gel.

18. The method of claim 15, further comprising the step of burning the adsorbent to recover the catalytic metal.

19. A method of recovering palladium metal from a tin/palladium catalytic metal colloid containing composition comprising:

a) concentrating the tin/palladium catalytic metal colloid on a filter; then b) removing the palladium metal of the tin/palladium catalytic metal of the catalytic metal colloid from the filter with an oxidizer solution, the oxidizer solution comprising nitric acid, sulfuric acid, hydrochloric acid or mixtures thereof and hydrogen peroxide; then c) collecting the palladium metal on an adsorbent, the adsorbent comprising an amine borane resin or a thiacrown ether; and then d) burning the adsorbent with the palladium metal to recover the palladium metal.

* * * * *